US009138878B2

(12) United States Patent
Ramm

(10) Patent No.: US 9,138,878 B2
(45) Date of Patent: Sep. 22, 2015

(54) PISTON WIRE LOCK AND TOOL FOR INSERTING AND REMOVING THE SAME

(76) Inventor: Karl Ramm, Lake Forest, CA (US)

( * ) Notice: Subject to any disclaimer, the term of this patent is extended or adjusted under 35 U.S.C. 154(b) by 883 days.

(21) Appl. No.: 13/376,574

(22) PCT Filed: Nov. 29, 2011

(86) PCT No.: PCT/US2011/062347

§ 371 (c)(1), (2), (4) Date: Dec. 6, 2011

(87) PCT Pub. No.: WO2012/078401

PCT Pub. Date: Jun. 14, 2012

(65) Prior Publication Data

US 2012/0174770 A1 Jul. 12, 2012

Related U.S. Application Data

(60) Provisional application No. 61/420,699, filed on Dec. 7, 2010.

(51) Int. Cl.
*F16J 1/18* (2006.01)
*B25B 27/20* (2006.01)

(52) U.S. Cl.
CPC ............. *B25B 27/20* (2013.01); *Y10T 29/5363* (2015.01)

(58) Field of Classification Search
CPC ......... B25B 27/20; F16J 1/18; Y10T 29/5363
USPC .............. 92/128, 187, 189; 29/525, 222, 275, 29/278, 464, 468, 888.04, 888.05
See application file for complete search history.

(56) References Cited

U.S. PATENT DOCUMENTS

| | | | | |
|---|---|---|---|---|
| 1,637,247 | A | 7/1927 | Snyder | |
| 1,994,617 | A | 3/1935 | Meehan | |
| 2,213,884 | A | 9/1940 | Ohmart | |
| 2,567,543 | A | 9/1951 | Brell | |
| 5,301,580 | A | 4/1994 | Rosene et al. | |
| 5,988,296 | A * | 11/1999 | Zachman et al. | 173/1 |
| 6,279,456 | B1 | 8/2001 | Ueshima et al. | |
| 6,915,936 | B2 * | 7/2005 | Estes | 227/147 |
| 7,080,432 | B2 | 7/2006 | Norwood | |

FOREIGN PATENT DOCUMENTS

| | | |
|---|---|---|
| JP | 51-12050 | 1/1976 |
| KR | 1998-054619 | * 10/1998 |

OTHER PUBLICATIONS

International Search Report and Written Opinion, dated Jul. 27, 2012, from PCT Application No. PCT/US2011/062347.

* cited by examiner

*Primary Examiner* — Dwayne J White
*Assistant Examiner* — Logan Kraft

(57) ABSTRACT

An anti-rotation wire lock for use in a piston to reduce rotation of the anti-rotation wire lock while seated inside a wrist pin lock groove of the piston. The anti-rotation wire lock includes a wire lock body which curls from a first end of the wire lock body and a second end which extends in a direction out of a plane defined by the curled wire lock body. In addition, wire lock tools are disclosed for inserting and removing the anti-rotation wire lock.

7 Claims, 12 Drawing Sheets

PISTON WIRE LOCK AND TOOL FOR INSERTING AND REMOVING THE SAME

CROSS REFERENCE TO RELATED APPLICATIONS

This application claims the benefit and priority of U.S. Provisional Patent Application No. 61/420,699, filed on Dec. 7, 2010, entitled "Method and System for a Piston Anti-Rotating Wire Lock and Insertion and Removal of the Same," the entire contents of which are incorporated herein by reference.

FIELD

The present invention relates to a piston assembly in an internal combustion engine, compressor, or the like. More specifically, the present invention relates to a piston including an anti-rotation wire lock and a tool for inserting and removing the same.

BACKGROUND

Each year, consumers purchase motor vehicles, such as automobiles, motorcycles, boats and planes, from many different manufacturers. With each motor vehicle costing thousands of dollars, there is intense competition between manufacturers to produce motor vehicles which can run faster and are more reliable. However, when producing motor vehicles that run faster, inevitably, the engines must run at a faster rate. The increased operation of the engine translates into an increased operation of the piston and the components of the piston. More specifically, when moving the piston, a wrist pin is generally rotated and the more the piston moves, the greater the rate of rotation of the wrist pin. This is problematic in that the rotation of the wrist pins can also cause a conventional wire lock to rotate at an increased rate. The friction caused by the rotation of the conventional wire lock can deform the wrist pin lock groove where the conventional wire lock is secured. Deformation of the wrist pin lock groove can be catastrophic and can cause the wrist pin to malfunction and/or cause other problems. In some instances, the wrist pin may actually force its way out of the wrist pin lock groove. At high operations and rotations, a malfunction of the wrist pin can permanently or semi-permanently damage the piston.

Thus, conventional motor vehicles can have problems with reliability due to the rotation of the conventional wire lock and deformations caused by the rotation of the conventional wire lock. However, the conventional wire lock presents additional problems, too. When the conventional wire lock needs to be replaced, it is often difficult to retrieve them due to their propensity to rotate. Thus, users may use sharp objects in an attempt to pry the conventional wire lock away from the wrist pin lock groove. This can cause additional and sometimes severe damage to the piston.

While the damage caused by the conventional wire lock may appear to be minor or insignificant, any breach to the wrist pin lock groove can have catastrophic results to the piston and ultimately the engine. In such competitive motor vehicle markets, consumers will be unhappy with a motor vehicle which requires frequent engine repair or replacement.

Such problems can be further illustrated in FIG. 1, which shows a piston 200 including a piston body 102 defining an aperture 104. The aperture 104 is configured to receive a wrist pin (not shown). The piston body 102 also defines a wrist pin lock groove 106 for receiving a conventional wire lock 108. In addition, the piston body 102 also defines a pick lock notch

110. The pick lock notch 110 can be used to remove the conventional wire lock 108 from the wrist pin lock groove 106.

Although the conventional wire lock 108 fits into the wrist pin lock groove 106 through tension, rotation of the wrist pin in a direction indicated by arrow 122, for example, may cause the conventional wire lock 108 to rotate in the wrist pin lock groove 106. As shown in FIG. 1, there is no mechanical device to physically lock the conventional wire lock 108 into a substantially singular location. Thus, when a piston is reciprocating at high velocities and high rotations per minute, the wrist pin is also spinning at high rates. Since the wrist pin is located in the aperture 104, it is in contact with the conventional wire lock 108. This contact generally forces the conventional wire lock 108 to rotate within the wrist pin lock groove 106. The rotation of the conventional wire lock 108 within the wrist pin lock groove 106 causes deformation of the wrist pin lock groove 106 and possibly even engine failure due to the wrist pin forcing its way beyond the conventional wire lock 108. In addition, the conventional wire lock 108 can be rotated to a position such that the removal and replacement of the conventional wire lock 108 can be hazardous to the piston.

SUMMARY

The present application generally concerns an anti-rotation wire lock, a piston assembly including an anti-rotation wire lock, and tools for inserting and removing a wire lock. The anti-rotation wire lock of the present disclosure addresses the deformation concerns discussed above by ordinarily reducing the amount of wire lock rotation during operation of the piston. This allows the piston and the engine to function at a higher level without damaging the piston or the engine. As previously noted, such damage to the piston or the engine can cost the consumer a substantial amount of money to repair or replace the engine.

According to one embodiment, an anti-rotation wire lock includes a wire lock body which curls from a first end of the wire lock body and a second end which extends in a direction out of a plane formed by the curled wire lock body. With this configuration, it is ordinarily possible for the second end to fit into the pick lock notch and thereby reduce rotation of the anti-rotation wire lock in the wrist pin lock groove.

In addition, the foregoing configuration ordinarily facilitates insertion and removal of the anti-rotation wire lock with less rotation than for a conventional wire lock, thereby making insertion and removal of the anti-rotation wire lock easier. Thus, users who want to replace the anti-rotation wire lock can remove the anti-rotation wire lock in an easy manner with minimal contact to the wrist pin lock groove from sharp objects. This minimal contact further reduces the chances that the wrist pin lock groove will be damaged.

To further simplify the removal process and to further protect the wrist pin lock groove, the present disclosure also includes embodiments of a wire lock tool for insertion and removal of a wire lock. According to one embodiment, a wire lock tool includes a shaft having an insertion end defining a through hole constructed to mate with a first end of a wire lock and a removal end on a side opposite the insertion end and defining a blind hole constructed to mate with a bent end of the wire lock.

According to another embodiment of a wire lock tool, the wire lock tool includes a shaft and a handle connected to the shaft on one end of the shaft. The shaft includes a blind hole on an end portion of the shaft opposite the handle and the blind hole is constructed to mate with a bent end of a wire lock.

The use of the foregoing wire lock tools for inserting and removing a wire lock ordinarily reduces the need to use sharp tools which may damage the wrist pin lock groove. Furthermore, the foregoing wire lock tools can also facilitate the easy insertion and removal of the anti-rotation wire lock, which can reduce time spent replacing a wire lock. This can also further increase cost savings associated with the use of the anti-rotation wire lock.

Such advantages provided by the anti-rotation wire lock and tools of the present disclosure can improve the reliability of motor vehicles produced by manufacturers, and in some instances, allow manufacturers to increase the performance of the motor vehicle. Furthermore, the use of the anti-rotation wire lock and tools of the present disclosure can increase confidence in consumers purchasing motor vehicles, resulting in higher sales.

BRIEF DESCRIPTION OF THE DRAWINGS

The features and advantages of the present embodiments will become more apparent from the detailed description set forth below when taken in conjunction with the drawings. The drawings and the associated descriptions are provided to illustrate embodiments of the invention and not to limit the scope of the invention. Reference numbers are reused throughout the drawings to indicate correspondence between referenced elements.

DETAILED DESCRIPTION

In the following detailed description, numerous specific details are set forth to provide a full understanding of the present invention. It will be apparent, however, to one ordinarily skilled in the art that the present invention may be practiced without some of these specific details. In other instances, well-known structures and techniques have not been shown in detail to avoid unnecessarily obscuring the present invention.

Figure 1:
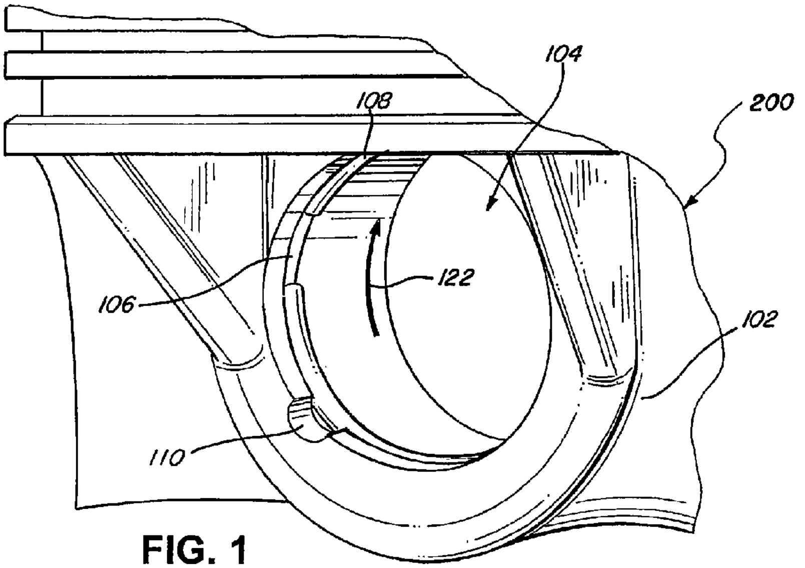
FIG. 1 illustrates a close up view of a piston assembly including a conventional wire lock.
Figure 2:
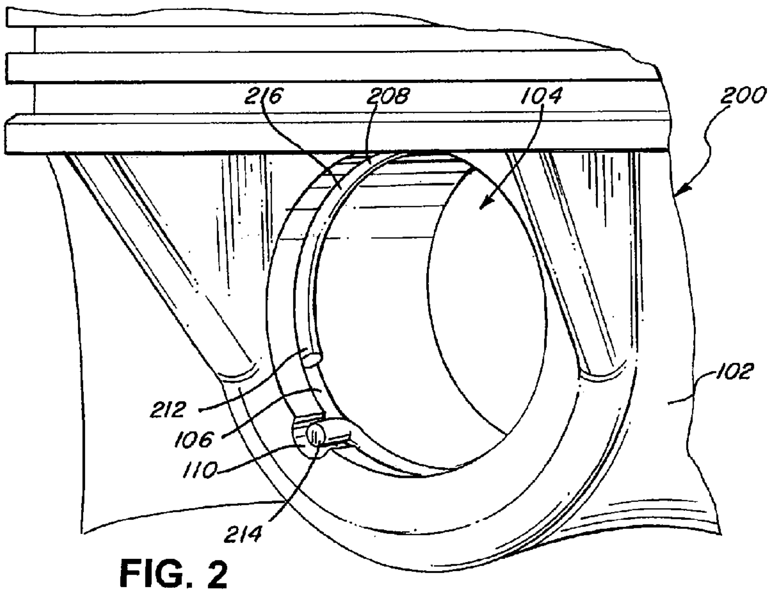
FIG. 2 illustrates a close-up view of a piston assembly including an anti-rotation wire lock according to an embodiment of the present invention.

FIG. 2 illustrates a close-up view of a piston including an anti-rotation wire lock according to an embodiment of the present invention. The piston 200 includes a piston body 102 defining an aperture 104. The aperture 104 is configured to receive a wrist pin (such as wrist pin 112 in FIG. 4). The piston body 102 also defines a wrist pin lock groove 106 for receiving an anti-rotation wire lock 208. In addition, the piston body 102 also defines a pick lock notch 110. Both the wrist pin lock groove 106 and/or the pick lock notch 110 are part of the aperture 104. The pick lock notch 110 can be used to remove the anti-rotation wire lock 208 from the wrist pin lock groove 106.

As shown in FIG. 2, the wire lock body 216 of the anti-rotation wire lock 208 is configured to be placed into the wrist pin lock groove 106. Such placement may be accomplished through tension of the wire lock body 216, which is generally in a "C" shape. Second end 214 is configured to be placed into the pick lock notch 110, thereby reducing rotation of the wire lock body 216 even when the wrist pin rotates in the aperture 104.

In one embodiment, the anti-rotation wire lock 208 can be formed, for example, from chrome silicon and can have, for example, a finish of black oxide. However, the anti-rotation wire lock 208 can also be formed from other materials and have other finishes that are suitable for use in a piston. Also, the anti-rotation wire lock 208 can have a hardness of RC 52-54. However, the anti-rotation wire lock 208 can have any hardness which would render it suitable for use in a piston. In one embodiment, the ends of the anti-rotation wire lock 208 are deburred. In yet another embodiment, the entire anti-rotation wire lock can be deburred.

Figure 3A:
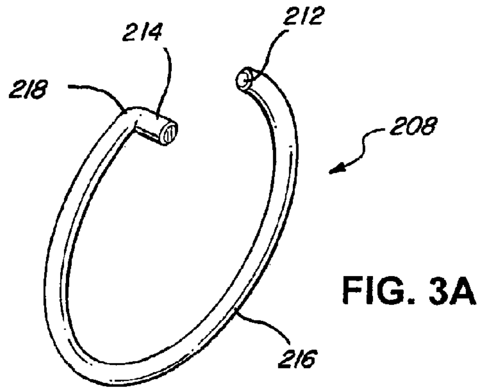
FIG. 3A illustrates a perspective view of an anti-rotation wire lock according to an embodiment of the present invention.

FIG. 3A illustrates a perspective view of the anti-rotation wire lock 208 according to an example embodiment. As shown in FIG. 3A, the wire lock body 216 curls from the first end 212 toward a bend 218. The second end 214 is connected to the wire lock body 216 by the bend 218 and extends in a direction out of a plane defined by the wire lock body 216.

Figure 3B:
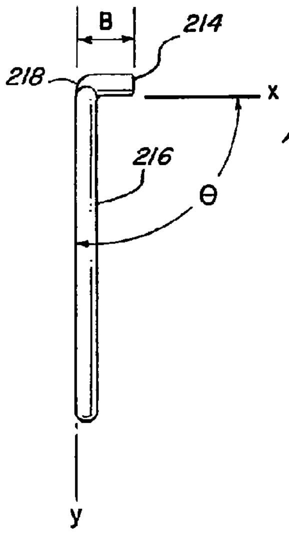
FIG. 3B illustrates a side view of an anti-rotation wire lock according to an embodiment of the present invention.

This relationship is further illustrated in FIG. 3B, which depicts a side view of the anti-rotation wire lock 208. In particular, the second end 214 extends along a plane x that is out of a plane y defined by the wire lock body 216. In the embodiment of FIG. 3B, the second end 214 extends in a direction substantially perpendicular to plane y. Accordingly, in this example embodiment, angle θ in FIG. 3B is approximately 90 degrees. In addition, the second end 214 extends from the wire lock body 216 along plane x by a distance B. In one example embodiment, the distance B can be within a range of 0.10 to 0.16 inches. However, it is understood that the second end 214 can protrude from the anti-rotation wire lock body 216 by any other suitable length so that the anti-rotation wire lock 208 can rest in the pick lock notch 110.

Figure 3C:
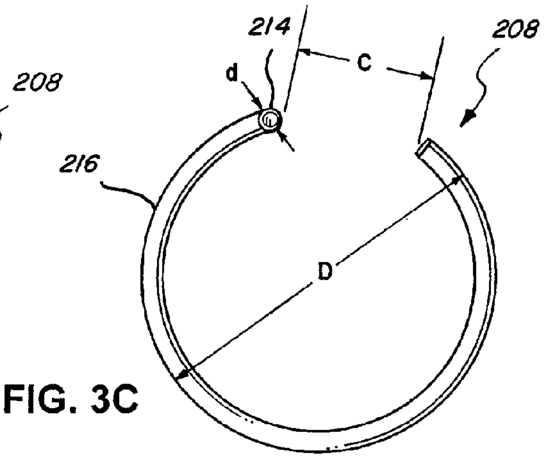
FIG. 3C illustrates a front view of an anti-rotation wire lock according to an embodiment of the present invention.

FIG. 3C illustrates a front view of the anti-rotation wire lock 208 depicting a diameter D and opening C of the wire lock body 216. As will be appreciated by those of ordinary skill in the art, diameter D and opening C vary based upon the dimensions of the wrist pin lock groove in which the anti-rotation wire lock 208 is to rest. Similarly, diameter d of second end 214 varies based upon the dimensions of the pick lock notch in which the anti-rotation wire lock 208 is to rest. In one example embodiment, for example, the diameter d can be within a range of 0.0615 to 0.0635 inches. In yet another embodiment, diameter d can be within a range of 0.935 to 0.955 inches.

Although the second end 214 is on the left side of the opening C in FIG. 3C, it is understood that in other embodiments, the second end 214 and the first end 212 can be switched such that the second end 214 appears on the right side of opening C. This concept can be better understood by comparing the anti-rotation wire lock 208 of FIGS. 2 to 6 with the anti-rotation wire lock 209 of FIGS. 7 to 10.

Figure 3D:
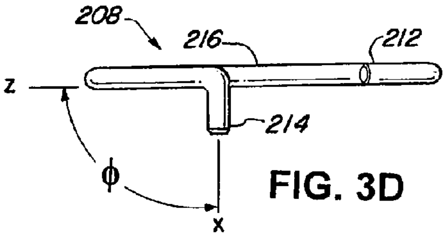
FIG. 3D illustrates a top view of an anti-rotation wire lock according to an embodiment of the present invention.

As shown in the top view of FIG. 3D, the second end 214 defines an angle ϕ between plane x and a plane z, which is horizontal to the top surface of the wire lock body 216. In this example embodiment, angle ϕ is approximately 90 degrees, however, angle ϕ can vary without departing from the spirit and scope of the present invention. For example, in one embodiment, angle ϕ can be within a range of 60 degrees to 130 degrees and still rest in the pick lock notch 110 to provide rotational resistance. In other embodiments, the second end 214 can curl or have a circular shape while being able to fit into the pick lock notch 110 and provide rotational resistance.

By reducing the rotation of the anti-rotation wire lock 208, the wear and tear of the wrist pin lock groove 106 is substantially reduced or eliminated. This can ordinarily increase the longevity of the piston 200 and in some instances, allow for the piston 200 to operate at higher levels resulting in greater performance. In addition, the orientation of second end 214 to wire lock body 216 also facilitates easy insertion and removal of the anti-rotation wire lock 208, as discussed below.

Figure 4:
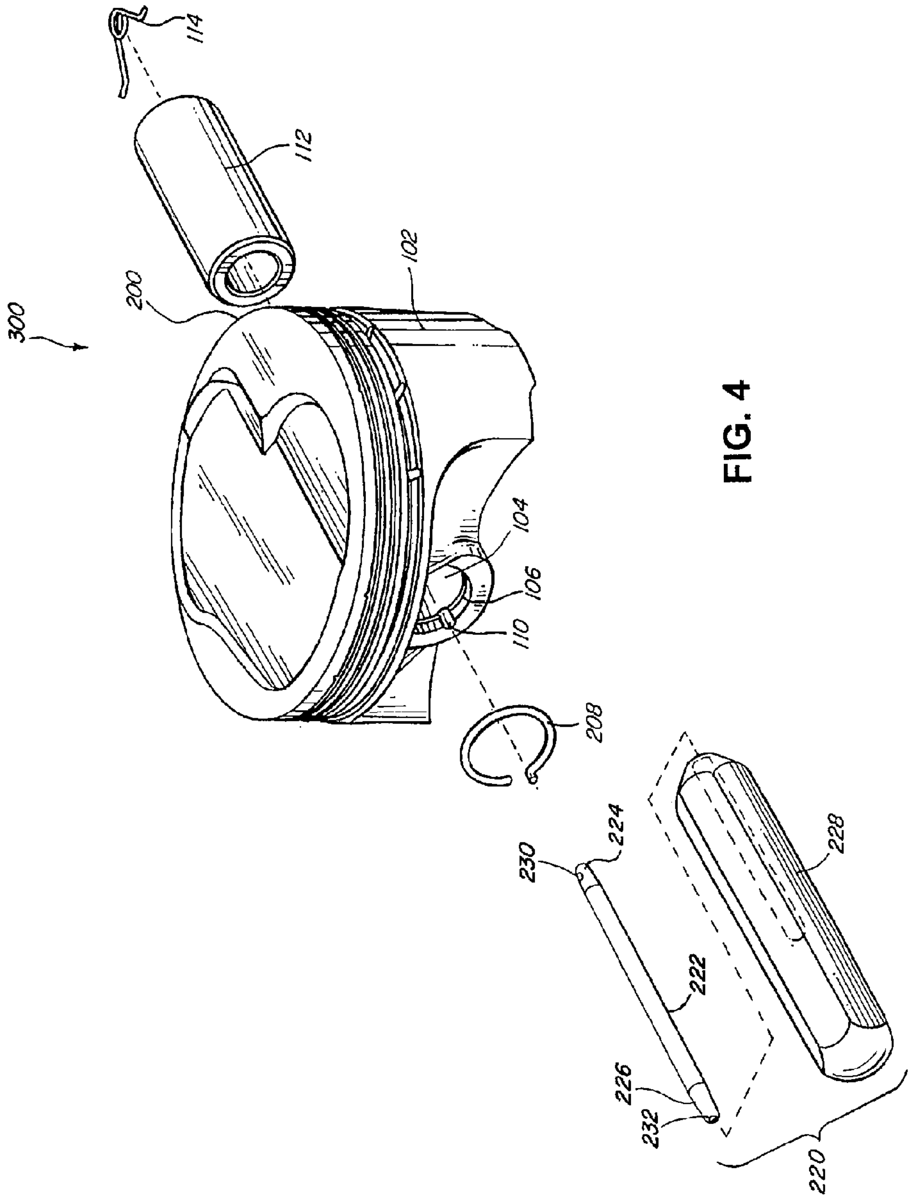
FIG. 4 illustrates an exploded view of a piston assembly with a first embodiment of a wire lock tool for inserting and removing a wire lock.
Figure 8:
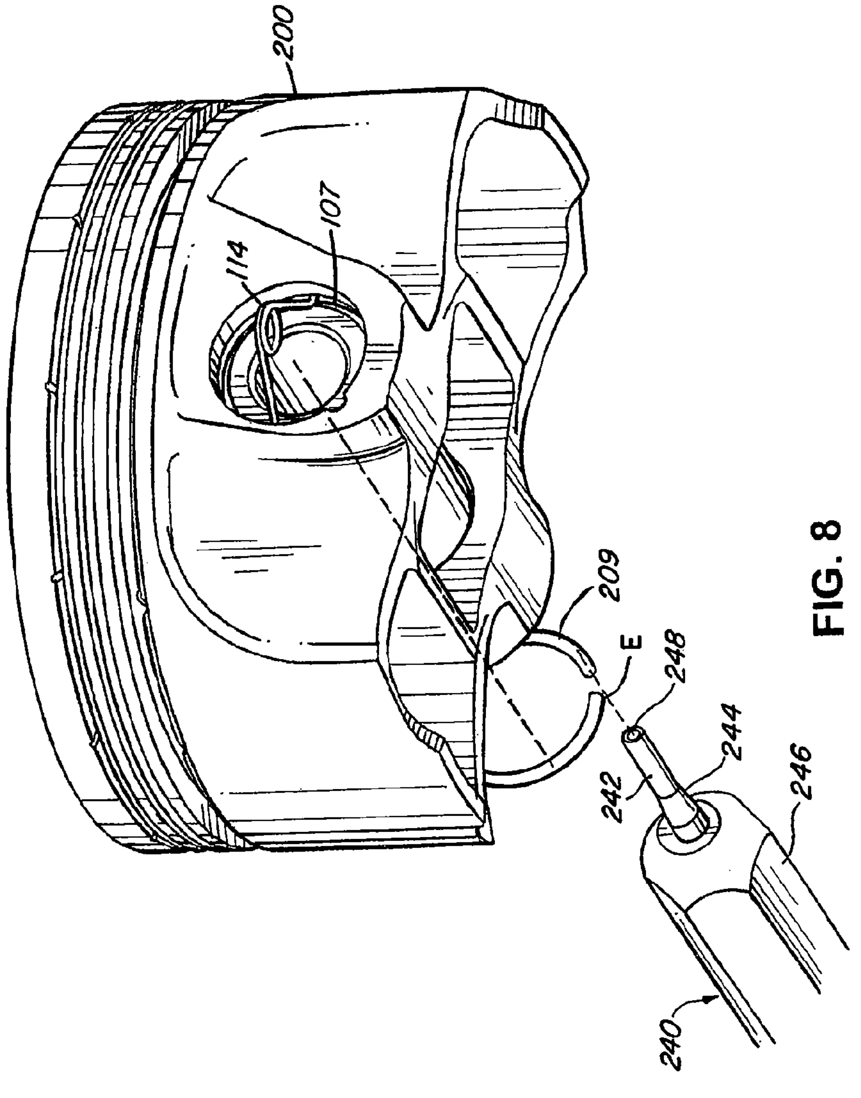
FIG. 8 illustrates a rear perspective view of insertion of a wire lock using the wire lock tool of the second embodiment.

FIG. 4 illustrates an exploded view of a piston assembly 300 when inserting the anti-rotation wire lock 208 into the wrist pin lock groove 106 of piston body 102. Before inserting the anti-rotation wire lock 208, the wrist pin 112 is inserted into the aperture 104. The wrist pin 112 is temporarily held in aperture 104 using a clip 114 that fits into a wrist pin lock groove 107 on the opposite side of the anti-rotation wire lock 208, as shown in FIG. 8.

In FIG. 4, the anti-rotation wire lock 208 is inserted using a first embodiment of a wire lock tool. As shown in FIG. 4, wire lock tool 220 includes a shaft 222 having an insertion end 224 and a removal end 226. The insertion end 224 can be used, for example, to insert the anti-rotation wire lock 208, while the removal end 226 can be used, for example, to remove the anti-rotation wire lock 208. Both the insertion end 224 and the removal end 226 have an outside surface that is tapered so as to provide easier access and movement of the anti-rotation wire lock 208 when it is positioned in the wrist pin lock groove. In addition, both the insertion end 224 and the removal end 226 of the present embodiment are rounded at their ends to further reduce the likelihood of scratching piston 200.

Wire lock tool 220 optionally includes a removable handle 228 which is constructed to fit onto the removal end 226 and a middle portion of the shaft 222 when the wire lock tool 220 is in a configuration for inserting the anti-rotation wire lock 208. Similarly, the handle 228 is also constructed to fit onto the insertion end 224 and a middle portion of the shaft 222 when the wire lock tool 220 is in a configuration for removing the anti-rotation wire lock 208.

As shown in FIG. 4, the insertion end 224 defines a through hole 230 which is constructed to mate with the first end 212 of the anti-rotation wire lock 208. In the embodiment of FIG. 4, the through hole 230 is substantially perpendicular to a longitudinal axis defined by the shaft 222. Opposite the insertion end 224, the removal end 226 defines a blind hole 232 which is constructed to mate with the second end 214 of the anti-rotation wire lock 208. In this regard, the blind hole 232 of the present embodiment is substantially parallel to a longitudinal axis defined by the shaft 222.

Figure 5:
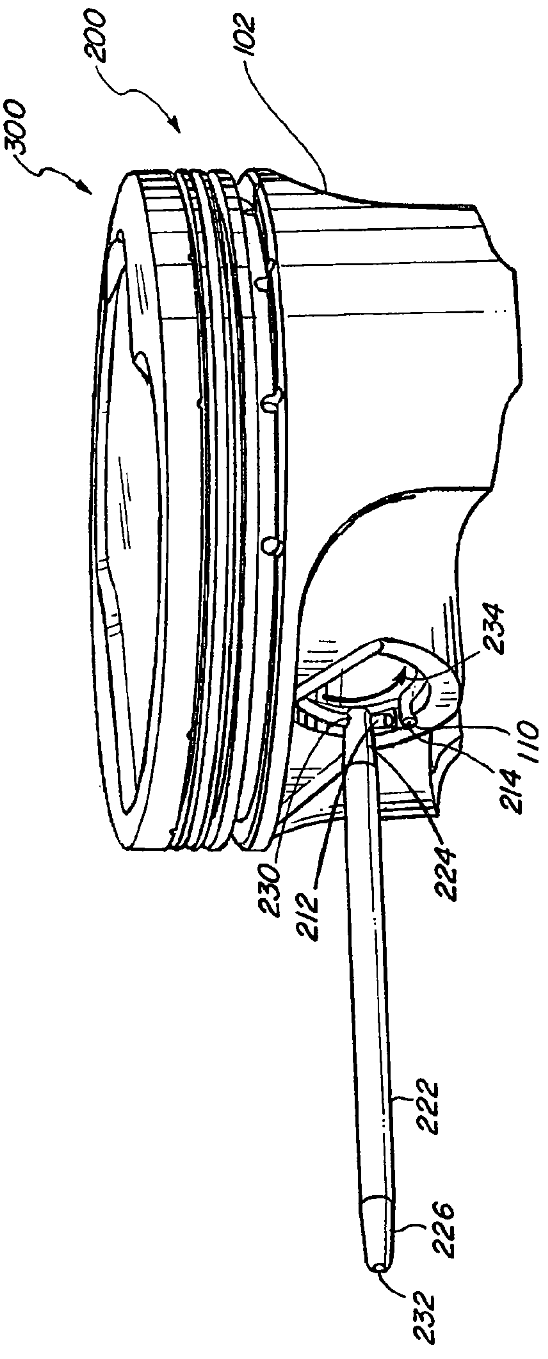
FIG. 5 illustrates insertion of a wire lock using the wire lock tool of the first embodiment.

FIG. 5 illustrates insertion of the anti-rotation wire lock 208 using the wire lock tool 220 without the removable handle 228 attached to the shaft 222. As shown in FIG. 5, to insert the anti-rotation wire lock 208, the second end 214 of the anti-rotation wire lock 208 is placed in the pick lock notch 110. The first end 212 is then secured in through hole 230 of the wire lock tool 220. By rotating the first end 212 in a direction 234 towards the second end 214, the anti-rotation wire lock 208 can be semi-deformed, temporarily reducing the diameter of the anti-rotation wire lock 208. This temporary deformation of the anti-rotation wire lock 208 results from the rotational resistance provided by the second end 214 when resting in the pick lock notch 110. The anti-rotation wire lock 208 can then be slipped into the wrist pin lock groove 106. Once the anti-rotation wire lock 208 is substantially in the wrist pin lock groove 106, the first end 212 can be rotated in an opposite direction of the direction 234 to increase the diameter of the anti-rotation wire lock 208 and allow for removal of the first end 212 from through hole 230.

Figure 6:
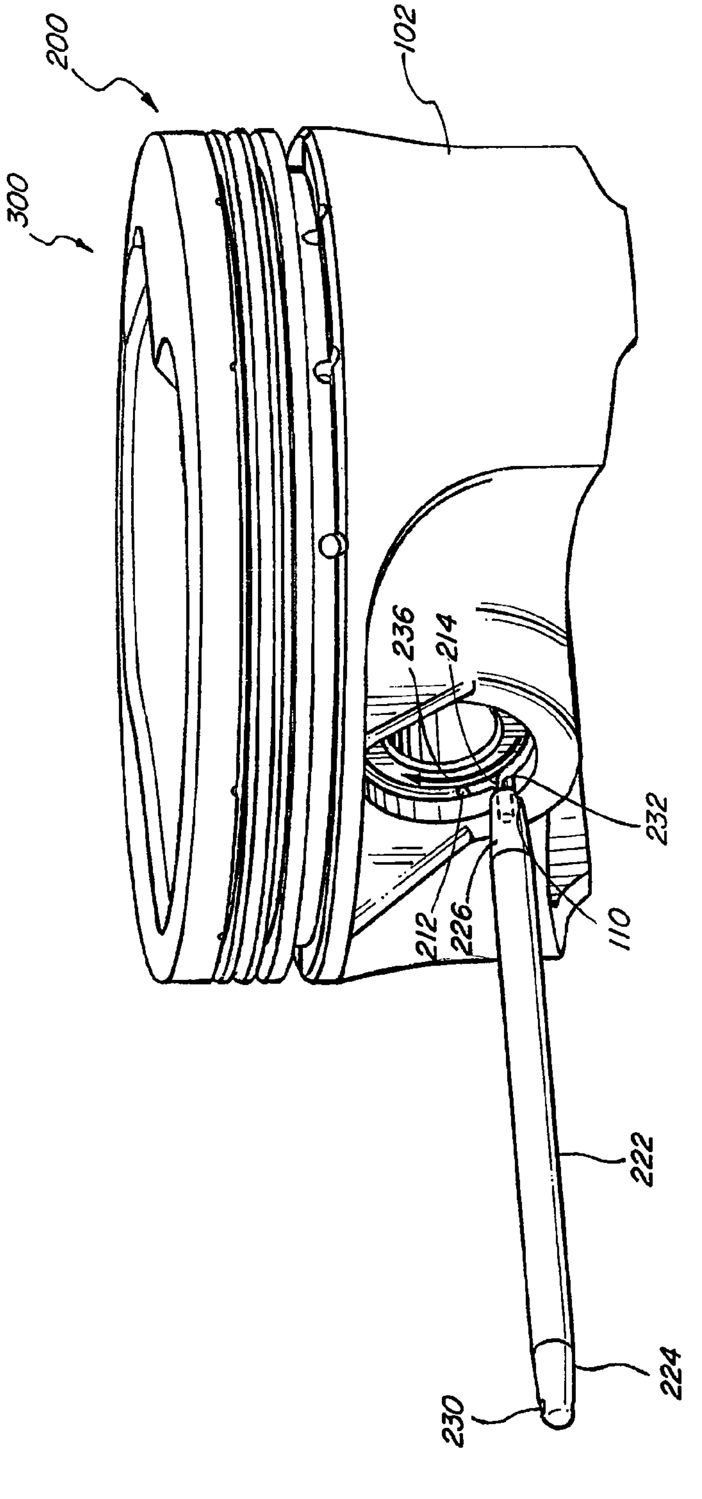
FIG. 6 illustrates removal of a wire lock using the wire lock tool of the first embodiment.

FIG. 6 illustrates removal of the anti-rotation wire lock 208 using the wire lock tool 220 without the removable handle 228 attached to the shaft 222. As shown in FIG. 6, to remove the anti-rotation wire lock 208, the shaft 222 of wire lock tool 220 is placed such that the second end 214 of the anti-rotation wire lock 208 is secured in blind hole 232. In this configuration, the second end 214 of anti-rotation wire lock 208 provides leverage for removing the anti-rotation wire lock 208 from the wrist pin lock groove 106. By rotating the second end 214 in a direction 236 towards the first end 212, the anti-rotation wire lock 208 can be semi-deformed, temporarily reducing the diameter of the anti-rotation wire lock 208. The anti-rotation wire lock 208 can then be slipped out of the wrist pin lock groove 106 and removed. Once the anti-rotation wire lock 208 is substantially out of the wrist pin lock groove 106, the diameter of the anti-rotation wire lock 208 will ordinarily increase as it returns to its normal shape.

As will be appreciated by those of ordinary skill in the art, the directions 234 and 236 for insertion and removal are merely opposite directions from each other. For example, if direction 236 is clockwise, then direction 234 is counterclockwise, and vice-versa. The respective directions for insertion and removal depend upon the sides of opening C (shown in FIG. 3C) that are chosen for the second end 214 and the first end 212. This can be better understood by comparing the anti-rotation wire lock 208 of FIG. 4 with the anti-rotation wire lock 209 of FIG. 7.

Figure 7:
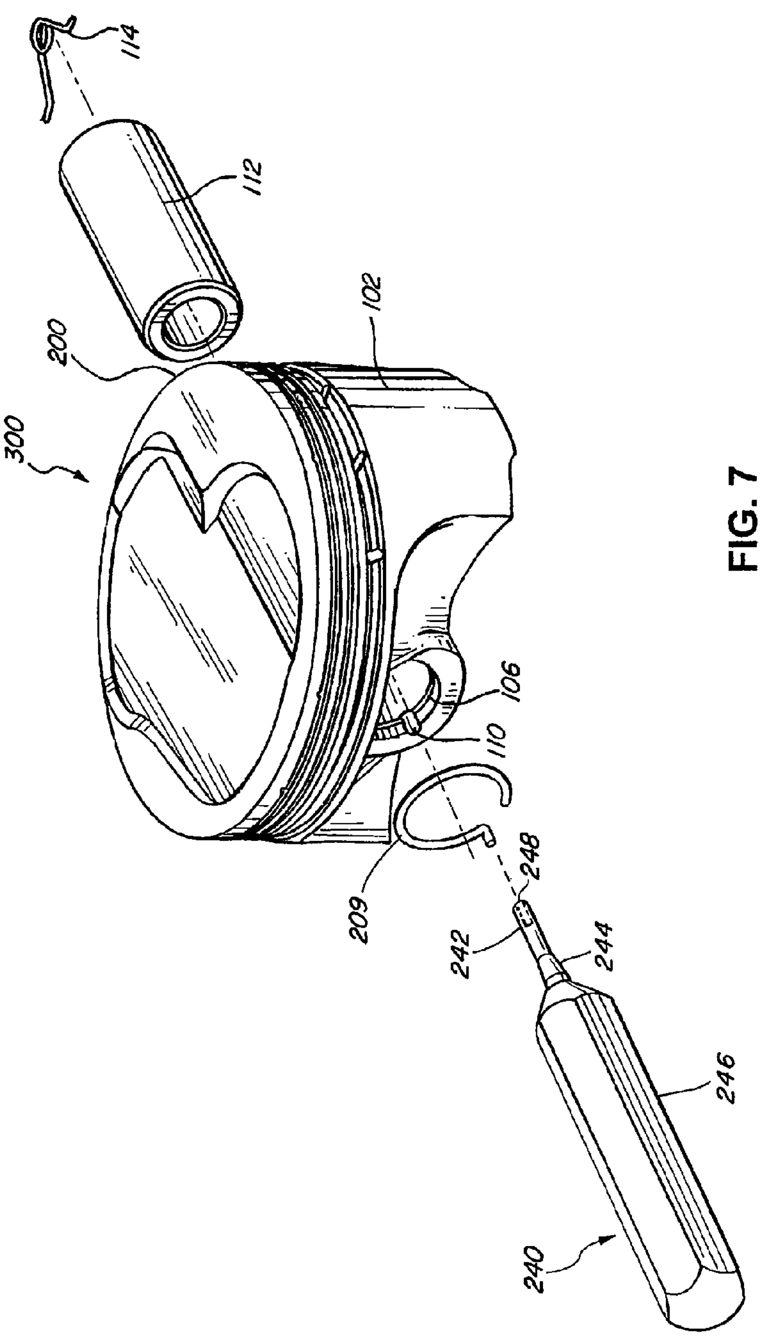
FIG. 7 illustrates an exploded view of a piston assembly with second embodiment of a wire lock tool for inserting and removing a wire lock.

FIG. 7 illustrates an exploded view of piston assembly 300 when inserting an anti-rotation wire lock 209 into the wrist pin lock groove 106 of piston body 102. As with FIG. 4, before inserting the anti-rotation wire lock 209, the wrist pin 112 is inserted into the aperture 104. The wrist pin 112 is temporarily held in aperture 104 using a clip 114 that fits into a wrist pin lock groove 107 on the opposite side of the anti-rotation wire lock 209, as shown in FIG. 8.

In FIG. 7, the anti-rotation wire lock 209 is inserted using a second embodiment of a wire lock tool. As shown in FIG. 7, wire lock tool 240 includes a shaft 242 and a handle 246. The shaft 242 includes a taper 244 for added strength and a blind hole 248 for mating with the second end 214 of the anti-rotation wire lock 209. The blind hole 248 is substantially parallel to an axis defined by the shaft 242. In addition, the shaft 242 can have a rounded end near the blind hole 240 to further reduce the likelihood of scratching the piston 200.

FIG. 8 illustrates a rear perspective view of insertion of the anti-rotation wire lock 209 using the wire lock tool 240. As shown in FIG. 8, clip 114 is temporarily inserted into the wrist pin lock groove 107 after the wrist pin has been inserted into aperture 104. In this configuration, the wrist pin is ordinarily prevented from sliding out of aperture 104 while the anti-rotation wire lock 209 is inserted on the opposite side of the piston 102. After the first anti-rotation wire lock is completely inserted, clip 114 can be removed for insertion of a second anti-rotation wire lock into wrist pin lock groove 107.

Figure 9A:
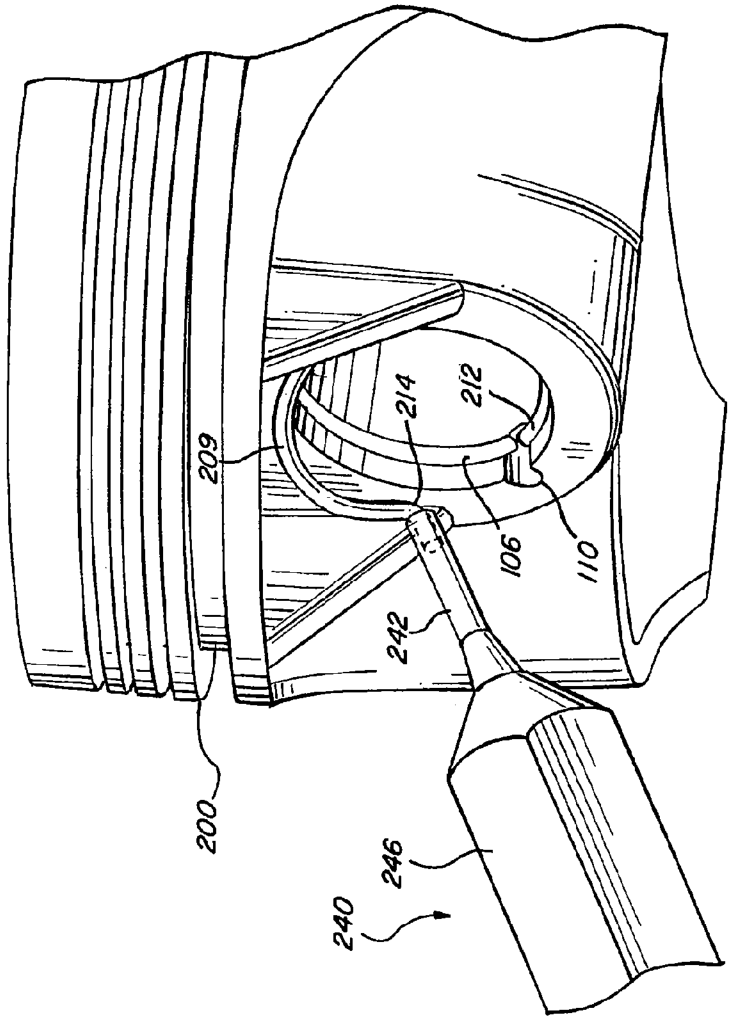
FIG. 9A illustrates an initial positioning of a wire lock during insertion of the wire lock with the wire lock tool of the second embodiment.

FIG. 9A depicts an initial positioning of anti-rotation wire lock 209 during insertion with wire lock tool 240. The first end 212 of the anti-rotation wire lock 209 is placed in the wrist pin lock groove 106 close to, if not in, pick lock notch 110. The shaft 242 of wire lock tool 240 is placed such that the second end 214 of the anti-rotation wire lock is secured in blind hole 248.

Figure 9B:
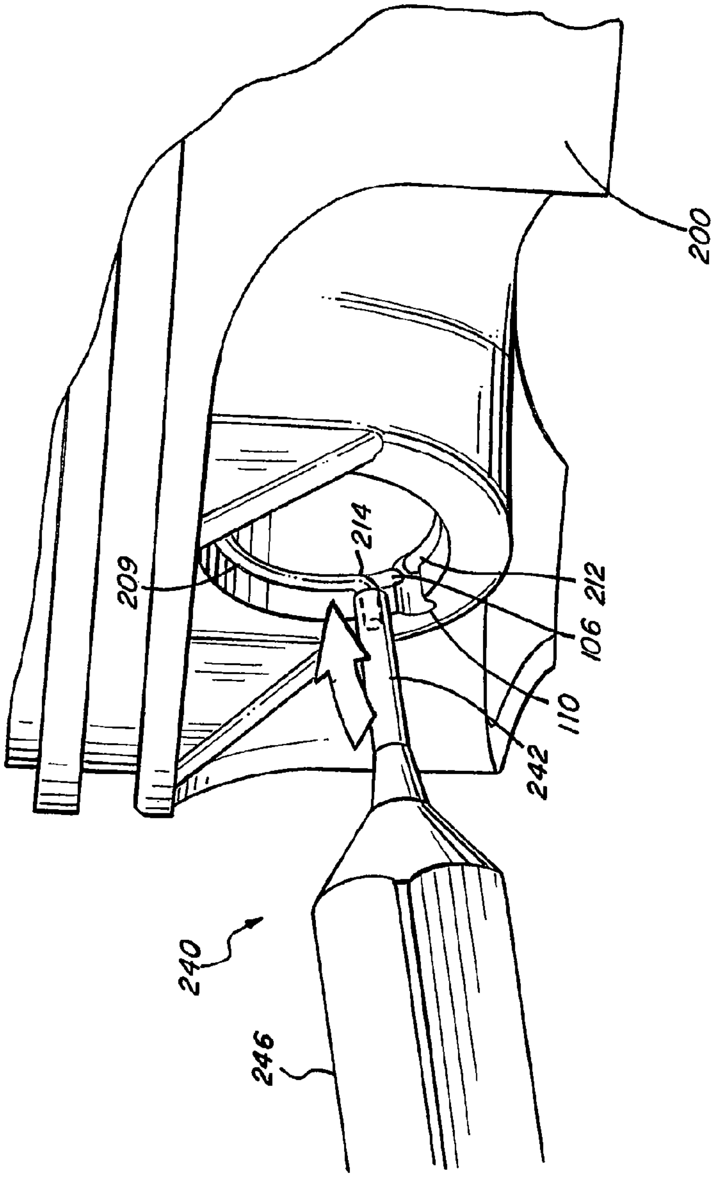
FIG. 9B illustrates subsequent positioning of the wire lock of FIG. 9A during insertion of the wire lock using the wire lock tool of the second embodiment.
Figure 9C:
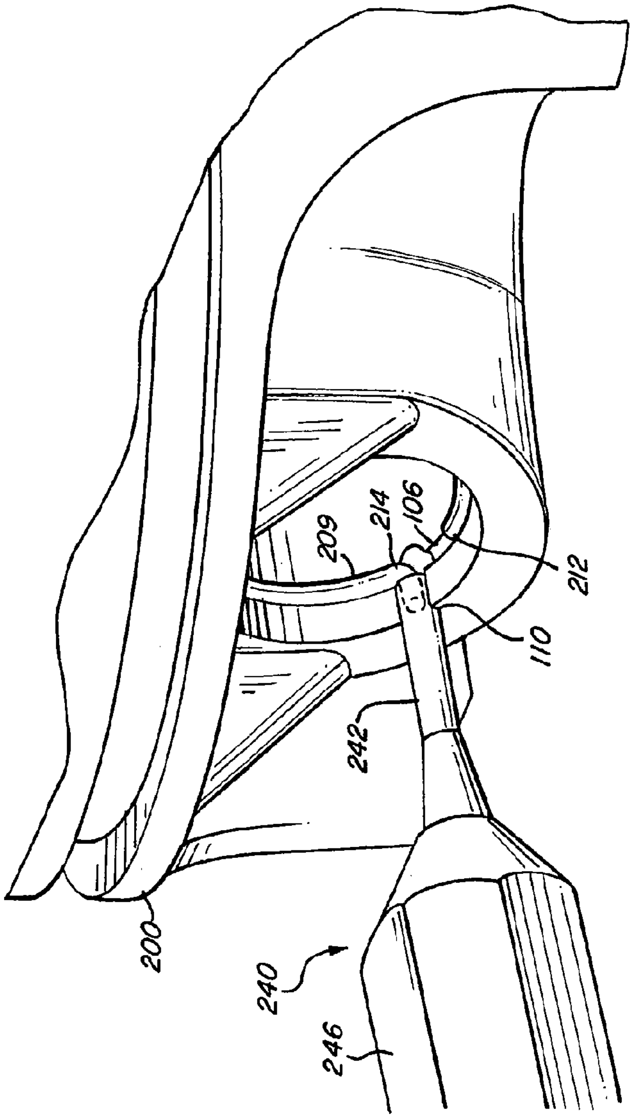
FIG. 9C illustrates a final positioning of the wire lock of FIGS. 9A and 9B during insertion of the wire lock using the wire lock tool of the second embodiment.

As shown in FIG. 9B, the anti-rotation wire lock 209 is then compressed towards the center of aperture 104 until the anti-rotation wire lock 209 slides into the wrist pin lock groove 106. If the second end 214 of the anti-rotation wire lock 209 is not already resting in pick lock notch 110, the anti-rotation wire lock 209 is rotated towards pick lock notch 110 until the second end 214 is positioned in pick lock notch 110, as shown in FIG. 9C. In the present embodiment, and as seen in FIGS. 9C and 10A, the end portion of shaft 242 fits into pick lock notch 110 for easy insertion and removal.

Figure 10A:
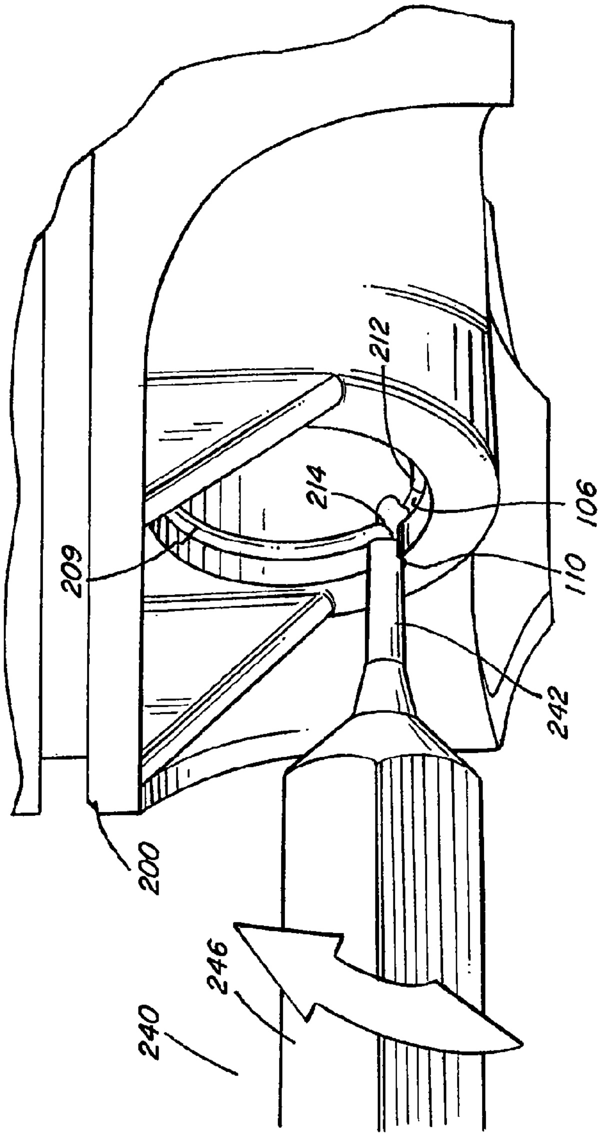
FIG. 10A illustrates an initial positioning of a wire lock during removal of the wire lock using the wire lock tool of the second embodiment.
Figure 10B:
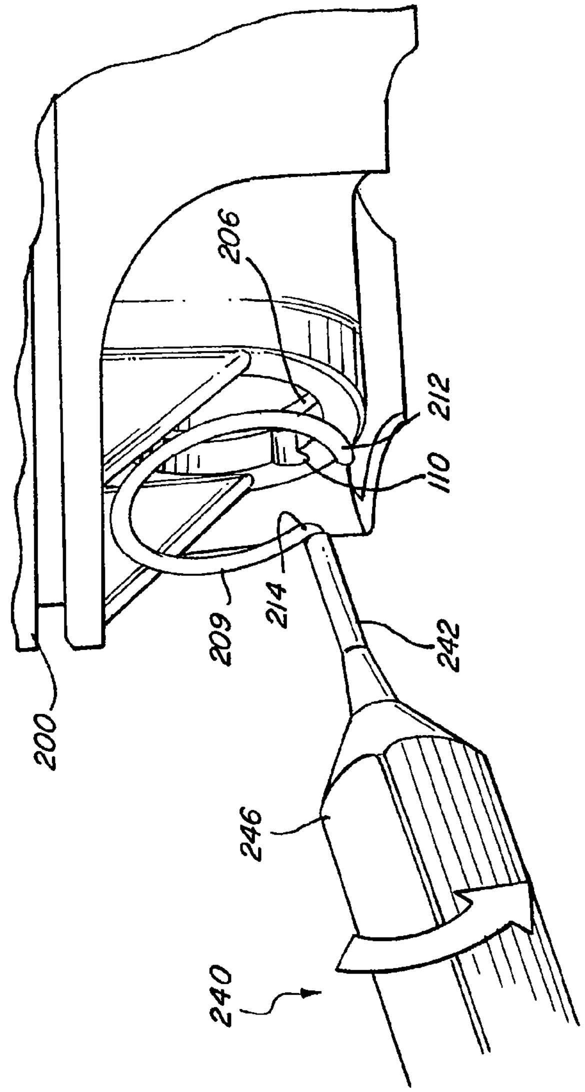
FIG. 10B illustrates a final positioning of a wire lock during removal of the wire lock of FIG. 10A using the wire lock tool of the second embodiment.

FIGS. 10A and 10B illustrate removal of the anti-rotation wire lock 209 from the wrist pin lock groove 106 using wire lock tool 240. In FIG. 10A, an end portion of shaft 242 is placed in pick lock notch 110 such that the second end 214 of the anti-rotation wire lock 209 is secured in blind hole 248 of the wire lock tool 240. The handle 246 of the wire lock tool 240 is then moved in the general direction indicated by the arrow in FIG. 10A to pop the anti-rotation wire lock 209 out of the wrist pin lock groove 106. In this sense, the second end 214 of anti-rotation wire lock 209 provides leverage for removing the anti-rotation wire lock 209 from the wrist pin lock groove 106.

The handle 246 is then rotated in the general direction indicated by the arrow in FIG. 10B. As a result, the second end 214 of the anti-rotation wire lock 209 is rotated in a direction towards the first end 212 and the anti-rotation wire lock 209 is semi-deformed, temporarily reducing the diameter of the anti-rotation wire lock 209. The anti-rotation wire lock 209 can then be slipped out of the wrist pin lock groove 106 and removed. Once the anti-rotation wire lock 209 is substantially out of the wrist pin lock groove 106, the diameter of the anti-rotation wire lock 209 will ordinarily increase as it returns to its normal shape.

Thus, the above described use of wire lock tools in combination with the anti-rotation wire locks of the present disclosure allows for an easy insertion and an easy removal of an anti-rotation wire lock. This can ordinarily prevent damage to piston 200, and more specifically, to the wrist pin lock groove 106.

The terms "a," "an," "the" and similar referents used in the context of describing the invention (especially in the context of the following claims) are to be construed to cover both the singular and the plural, unless otherwise indicated herein or clearly contradicted by context. Recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member may be referred to and claimed individually or in any combination with other members of the group or other elements found herein. It is anticipated that one or more members of a group may be included in, or deleted from, a group for reasons of convenience and/or patentability. When any such inclusion or deletion occurs, the specification is deemed to contain the group as modified thus fulfilling the written description of any Markush groups used in the appended claims.

Certain embodiments of this invention are described herein, including the best mode known to the inventor for carrying out the invention. Of course, variations on these described embodiments will become apparent to those of ordinary skill in the art upon reading the foregoing description. The inventor expects skilled artisans to employ such variations as appropriate, and the inventor intends for the invention to be practiced otherwise than specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

In closing, it is to be understood that the embodiments of the invention disclosed herein are illustrative of the principles of the present invention. Other modifications that may be employed are within the scope of the invention. Thus, by way of example, but not of limitation, alternative configurations of the present invention may be utilized in accordance with the teachings herein. Accordingly, the present invention is not limited to that precisely as shown and described.

What is claimed is:

1. A wire lock tool for inserting a wire lock into a wrist pin lock groove of a piston and for removing the wire lock from the wrist pin lock groove of the piston, wherein the wire lock includes a first end and a bent end, the wire lock tool comprising:

a shaft including an insertion end defining a through hole constructed to mate with the first end of the wire lock, and a removal end on a side opposite the insertion end and defining a blind hole constructed to mate with the bent end of the wire lock.

2. The wire lock tool of claim 1, wherein the blind hole of the removal end is substantially parallel to an axis defined by the shaft.

3. The wire lock tool of claim 1, wherein the through hole of the insertion end is substantially perpendicular to an axis defined by the shaft.

4. The wire lock tool of claim 1, wherein the removal end fits into a pick lock notch of the piston.

5. The wire lock tool of claim 1, wherein at least a portion of the removal end tapers on an outside surface.

6. The wire lock tool of claim 1, wherein an outside surface of the removal end is rounded near the blind hole.

7. The wire lock tool of claim 1, further comprising a removable handle, wherein the removable handle is constructed to fit onto the insertion end and a middle portion of the shaft when the wire lock tool is in a configuration for removing the wire lock, and wherein the removable handle is constructed to fit onto the removal end and a middle portion of the shaft when the wire lock tool is in a configuration for inserting the wire lock.

* * * * *